(12) United States Patent
Breuer et al.

(10) Patent No.: US 10,776,239 B2
(45) Date of Patent: Sep. 15, 2020

(54) TAPE LIBRARY INTEGRATED FAILURE INDICATION BASED ON COGNITIVE SOUND AND VIBRATION ANALYSIS

(71) Applicant: INTERNATIONAL BUSINESS MACHINES CORPORATION, Armonk, NY (US)

(72) Inventors: Marcus Breuer, Dalheim (DE); Werner Jäckle, Gau-Bischofsheim (DE); Frank Krick, Ockenheim (DE); Thorsten Muehge, Budenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 15/828,358

(22) Filed: Nov. 30, 2017

(65) Prior Publication Data

US 2019/0163599 A1    May 30, 2019

(51) Int. Cl.
*G06F 15/16* (2006.01)
*G06F 11/30* (2006.01)
(Continued)

(52) U.S. Cl.
CPC ...... *G06F 11/3089* (2013.01); *G06F 11/0766* (2013.01); *G06F 11/16* (2013.01); *G06F 11/3034* (2013.01); *G06F 11/3058* (2013.01)

(58) Field of Classification Search
CPC .......... H04R 3/005; H04R 1/406; H04R 3/04; H04R 1/1041; H04R 1/1083; H04R 1/46;
(Continued)

(56) References Cited

U.S. PATENT DOCUMENTS 5,820,055 A  * 10/1998  Leger ................. G11B 15/6835
                                                            242/337
6,968,291 B1 * 11/2005  Desai .................. G06F 11/3006
                                                            370/254
(Continued)

FOREIGN PATENT DOCUMENTS

CN        102752454 B      12/2014

OTHER PUBLICATIONS

Airbus, "Delta Air Lines Becomes Launch Customer of Airbus' Digital Prognostics and Risk-Management Solution," Airbus Press Release, May 30, 2016, 1 Page, http://www.airbus.com/newsroom/press-releases/en/2016/05/delta-air-lines-becomes-launch-customer-of-airbus-digital-prognostics-and-risk-management-solution.html, Accessed on Oct. 17, 2017.
(Continued)

*Primary Examiner* — Michael A Keller
*Assistant Examiner* — Thao D Duong
(74) *Attorney, Agent, or Firm* — Samuel A. Waldbaum

(57) ABSTRACT

A method, computer system, and a computer program product for integrated failure indication is provided. The present invention may include receiving a plurality of sensor data from a plurality of sensors mounted within the tape system. The present invention may then include determining that the received plurality of sensor data is abnormal. The present invention may then include generating an alert based on determining that the received plurality of sensor data is abnormal. The present invention may lastly include sending the generated alert to a program manager.

20 Claims, 7 Drawing Sheets

(51) Int. Cl.
*G06F 11/07* (2006.01)
*G06F 11/16* (2006.01)

(58) Field of Classification Search
CPC ............ H04R 2410/05; H04R 2430/01; H04R 25/507; B65H 2220/01; B65H 2515/314; B65H 2515/34; B65H 2515/50; B65H 2220/03
See application file for complete search history.

(56) References Cited

U.S. PATENT DOCUMENTS

| | | | |
|---|---|---|---|
| 8,406,096 B1 | 3/2013 | Edling et al. | |
| 8,861,324 B1* | 10/2014 | Bui | G11B 15/60 369/53.41 |
| 9,092,741 B1* | 7/2015 | Goparaju | G05B 15/02 |
| 2010/0321811 A1 | 12/2010 | Goberis et al. | |
| 2013/0128384 A1 | 5/2013 | Tolliver | |
| 2013/0201316 A1* | 8/2013 | Binder | H04L 67/12 348/77 |
| 2016/0162198 A1 | 6/2016 | Vijayan et al. | |
| 2017/0316487 A1* | 11/2017 | Mazed | G06Q 30/0241 |

OTHER PUBLICATIONS

Hétu et al., "The Hearing Aid as Warning Signal Receiver in Noisy Workplaces," Journal of the Canadian Acoustical Association, 1993, p. 27-28, vol. 21, No. 3.

Hewlett Packard, "HPE StoreEver ESL G3 Tape Libraries—Troubleshooting," Hewlett Packard Enterprise Support Center, p. 1-15, https://support.hpe.com/hpsc/doc/public/display?docId=emr_na-c03843731, Accessed on Oct. 17, 2017.

Mell et al., "The NIST Definition of Cloud Computing," National Institute of Standards and Technology, Sep. 2011, p. 1-3, Special Publication 800-145.

Screen capture from YouTube video clip entitled IBM 3584 Tape Library:, 3 pages, uploaded on Mar. 21, 2015 by user "TechSecGuru". Retrieved from the Internet: <URL: https://www.youtube.com/watch?v=ANQTiwAloLI>.

Screen capture from YouTube video clip entitled "Installation of an IBM TS3500 tape library at CSCS", 3 pages, uploaded on Feb. 27, 2013 by user "cscsch". Retrieved from the Internet: <URL: https://www.youtube.com/watch?v=1yUZ81dCqBg>.

* cited by examiner

TAPE LIBRARY INTEGRATED FAILURE INDICATION BASED ON COGNITIVE SOUND AND VIBRATION ANALYSIS

BACKGROUND

The present invention relates generally to the field of computing, and more particularly to integrated failure recognition.

Physical hardware failures within a tape library storage system may include a gripper which is unable to move, an unreadable tape, a failed drive, or a tape which is lost while moving, among other failures which have fatal consequences to hardware and data.

SUMMARY

Embodiments of the present invention disclose a method, computer system, and a computer program product for integrated failure indication. The present invention may include receiving a plurality of sensor data from a plurality of sensors mounted within the tape system. The present invention may then include determining that the received plurality of sensor data is abnormal. The present invention may then include generating an alert based on determining that the received plurality of sensor data is abnormal. The present invention may lastly include sending the generated alert to a program manager.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
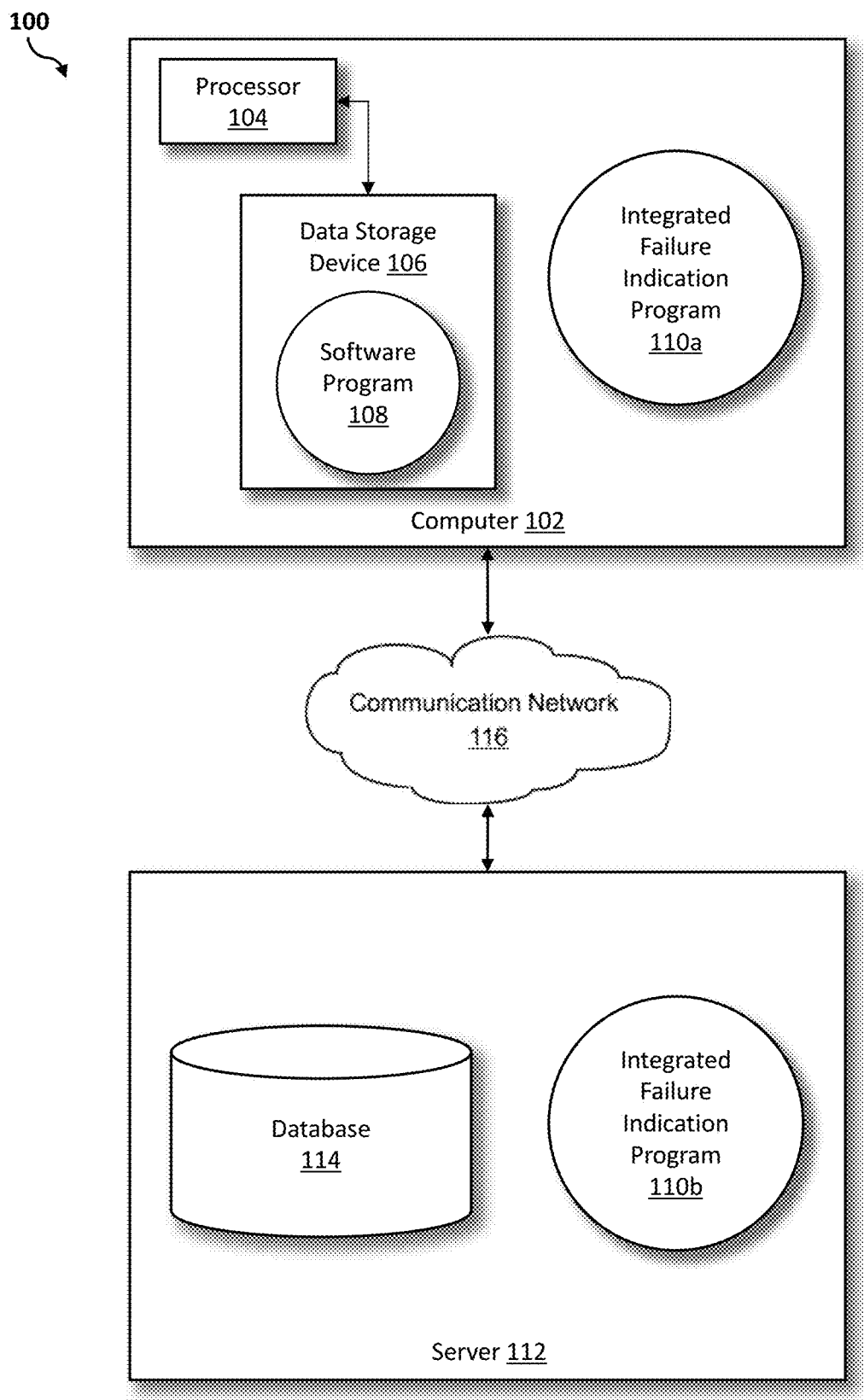
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for integrated failure indication with the possibility for predictive corrective actions. As such, the present embodiment has the capacity to improve the technical field of integrated failure recognition by placing sound and/or vibration sensors inside a tape library storage system and by utilizing the generated sounds to predict physical hardware failures. More specifically, the integrated failure indication system may receive sensor information from the sound and/or vibration sensors placed inside the tape library storage system, and may determine whether the received sounds are normal. If the sounds are determined to be abnormal, a program manager may be alerted. If the sounds are determined to be normal, the integrated failure indication system may continue to receive generated sensor information.

As described previously, physical hardware failures within a tape library storage system may include a gripper which is unable to move, an unreadable tape, a failed drive, or a tape which is lost while moving, among other failures which have fatal consequences to hardware and data. However, existing systems may not include sound and/or vibration sensors and may recognize a failure only after such failure has occurred. Further, existing systems may only detect a pre-defined set of failed events and may not have a means by which to engage in user training for future failures or engage in predictive corrective actions.

Therefore, it may be advantageous to, among other things, incorporate sound and/or vibration sensors into a tape library storage system and utilize a cognitive cloud solution to predict potential failures, detect undefined failed events, and involve the user community in failure training.

According to at least one embodiment, there may be many mechanical movements within a magnetic tape library system. As a result, if the magnetic tape library system is kept in a highly humid environment (i.e., in an Asian Pacific region, in a cold or wet basement, or in an uncontrolled datacenter), there may be resulting corrosion, which may not be realized by the operator of the magnetic tape library system while the system is functioning properly and data is being written to or read from the magnetic tape library system. The operator of the magnetic tape library system may only realize that a problem exists when the system stops functioning properly. For example, the operator of the system may recognize that the tape library system has been corroded only when tapes cannot be mounted within the system. At this point, it is often too late to recover the corroded hardware.

According to at least one embodiment, a sound and/or vibration sensor may be placed inside a tape library storage system and may be connected to a cognitive cloud solution, for example, via Bluetooth® (Bluetooth and all Bluetooth-based trademarks and logos are trademarks or registered trademarks of Bluetooth SIG, Inc. and/or its affiliates) or an Ethernet cable. The sensor or sensors may be battery powered or plug-in (e.g., using an AC power adapter). A piezoelectric sensor may be used to detect vibrations occurring within the tape library storage system. Piezoelectric sensors may be ceramic sensors which utilize piezoelectric effect, an electric charge that accumulates in solids in response to an applied mechanical stress. Sounds occurring within the tape library storage system may be detected by sound detecting microphones. Low frequencies may be detected by moving magnets and coils.

According to at least one embodiment, sensors located within the tape library may transfer data collected by the sound and/or vibration sensors via a standardized protocol (e.g., Message Queue Telemetry Transport or MQTT) to a cognitive cloud solution. The cognitive cloud solution may utilize a machine learning algorithm and may compare the collected data to a database of previously collected similar data, in order to determine whether the sounds or vibrations generated by the tape library storage system are normal or abnormal.

According to at least one embodiment, if the collected sensor information is determined to be abnormal, a program manager (i.e., a human user) may be alerted to the detected abnormality. This determination and alerting of the program manager may be, in effect, a predictive measure, done prior to any physical hardware failure within the tape library storage system.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an integrated failure indication program 110a. The networked computer environment 100 may also include a server 112 that is enabled to run an integrated failure indication program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the integrated failure indication program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the integrated failure indication program 110a, 110b (respectively) to predict upcoming failure events, detect undefined failure events, and involve the user community in failure training processes. The integrated failure indication method is explained in more detail below with respect to FIGS. 2 through 4.

Figure 2:
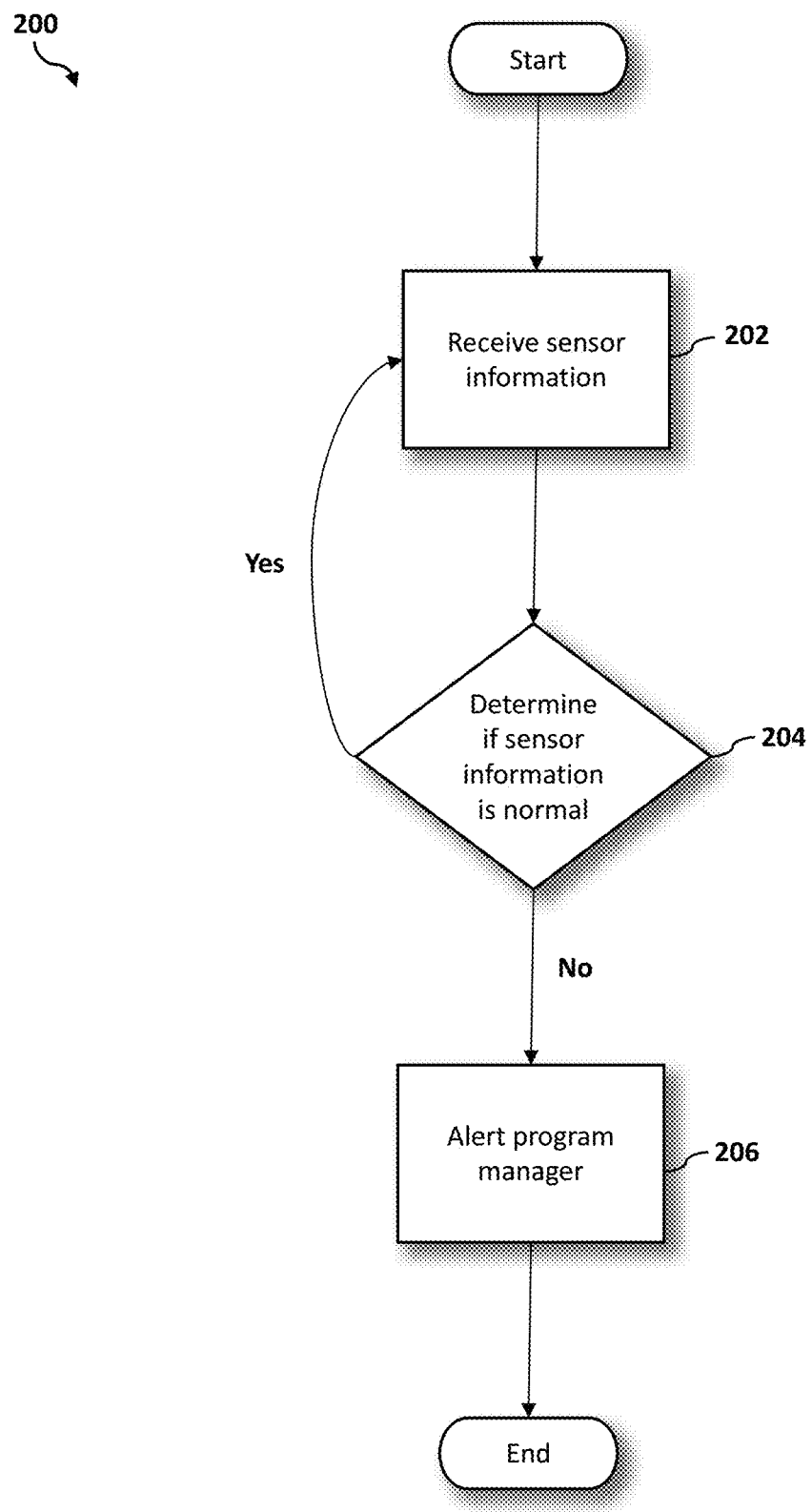
FIG. 2 is an operational flowchart illustrating a process for integrated failure indication according to at least one embodiment.

Referring now to FIG. 2, an operational flowchart illustrating the exemplary integrated failure indication process 200 used by the integrated failure indication program 110a and 110b according to at least one embodiment is depicted.

At 202, sensor information is received. A sound and/or vibration sensor may be placed inside a tape library storage system and may be connected, for example, via Bluetooth® or an Ethernet cable to permit data to travel via communication network 116. The sensor or sensors may be battery powered or plug-in (e.g., using an AC power adapter). For example, three sensors may be placed inside the tape library storage system; two on the X-rail, which moves horizontally within the tape library storage system, and one on the Y-rail, which moves vertically. The tape library storage system may include magnetic tape cartridges stored within the library, which may be mounted to computers (e.g., client computer 102) used to read or write data from the magnetic tape cartridges.

The sensors placed inside the tape library storage system may be piezoelectric sensors, used to detect vibrations occurring within the tape library storage system. Piezoelectric sensors utilize piezoelectric effect, an electric charge that accumulates in solids in response to an applied mechanical stress. Sounds occurring within the tape library storage system may be detected by sound detecting microphones. Low frequencies may be detected by moving magnets and coils. Electric motors running within the tape library storage system may make a specific noise (e.g., a humming) and the noise frequency range may change when something within the system is misaligned (e.g., a steel bearing within the tape library storage system may begin to squeak if the bearing becomes corroded).

Sound and/or vibration sensors (i.e., detectors) located within the tape library storage system may transfer collected data via a standardized protocol (e.g., MQTT, a machine-to-machine connectivity protocol used to transfer data from small sensors) to a cognitive cloud solution such as IBM Bluemix® (Bluemix and all Bluemix-based trademarks are trademarks or registered trademarks of International Business Machines Corporation in the United States, and/or other countries). The cognitive cloud solution (e.g., Bluemix®) may enable early recognition of an upcoming hardware malfunction by monitoring slight changes in the noises detected by electrical sensors placed within the tape library storage system (i.e., a piezoelectric sensor), which may detect audio frequencies not heard by the human ear.

The cognitive cloud solution may be a machine learning system that is trained using similar sound and/or vibration data. For example, the cognitive cloud solution may be trained on "normal sounds" (i.e., sounds of properly sounding tape drives) by receiving other normal sounds as input to the system and by building a repertoire of inputted normal sounds. Once the system has knowledge of what "normal sounds" sound like, a newly inputted normal sound may be classified as such by comparing the inputted sound to previously classified similar sounding sounds stored within a database 114 of sound and/or vibration data. The same may be done for "abnormal sounds," (i.e., sounds emitted by a malfunctioning tape storage system) to classify newly inputted abnormal sounds by the cognitive cloud solution.

The cognitive cloud solution may identify differences in noise frequencies created by physical hardware components of the tape library storage system. For example, two bearings with the same dimensions may have different rolling or rotating characteristics and may, therefore, create sounds with different frequencies. The cognitive cloud solution may collect the different noise frequencies and may create patterns from the frequencies which may be stored during the learning process. Thereafter, the stored frequencies may be referenced to compare new sounds generated by the tape library storage system and determine if the generated sounds are normal, as will be discussed in more detail below with respect to step 204. A Fourier analysis (i.e., using a Fourier spectrum) of the inputted sounds may further assist in training the machine learning model.

Next, at 204, the integrated failure indication program 110*a*, 110*b* determines if the sensor information is normal. As described previously at 202, the sound and/or vibration data may be transferred to the cognitive cloud solution via a standardized protocol such as MQTT. The cognitive cloud solution may determine whether the inputted sounds and/or vibrations are normal by comparing the sounds to the patterns previously created and stored by the cognitive cloud solution, as described previously at 202. The deep learning algorithm may classify the previously created and stored sounds and may utilize the classified sounds to classify new sounds.

If the cognitive cloud solution determines that the inputted sounds are normal (i.e., the cognitive cloud solution classifies the inputted sounds as normal based on previously classified patterns stored by the cognitive cloud solution), the integrated failure indication program 110*a*, 110*b* may continue to receive sensor information, as described previously at 202.

If the integrated failure indication program 110*a*, 110*b* determined sensor information is abnormal, as described previously at 204, then the program manager is alerted at 206. Alerting the program manager to an abnormal sound may enable the program manager to identify potential hardware failures, for example, where corrosion is slowly impacting the library hardware, and may enable the user of the tape library storage system to implement failure training processes. For example, if a cartridge gripper cannot detect a signal within the tape library storage system, the cartridge gripper may miscount and an offset of a cartridge location may result. The cartridge gripper may further strike the housing shelf, resulting in an abnormal sound, the detection of which may trigger a realignment within the tape library storage system, to place the cartridge in the correct shelf slot or magnetic tape drive. The program manager may also be alerted to the abnormal sound.

The program manager may be alerted by the cognitive cloud solution (i.e., Bluemix®) via a pop-up alert on the cognitive cloud solution interface, which may include the time that the abnormal noise was made and the location of the sensor that detected the abnormal noise, or via an email notification to the program manager, which may be sent to a predefined email address and may also include the location of the abnormal noise and the particulars of the sensor that detected the abnormal sound.

Figure 3:
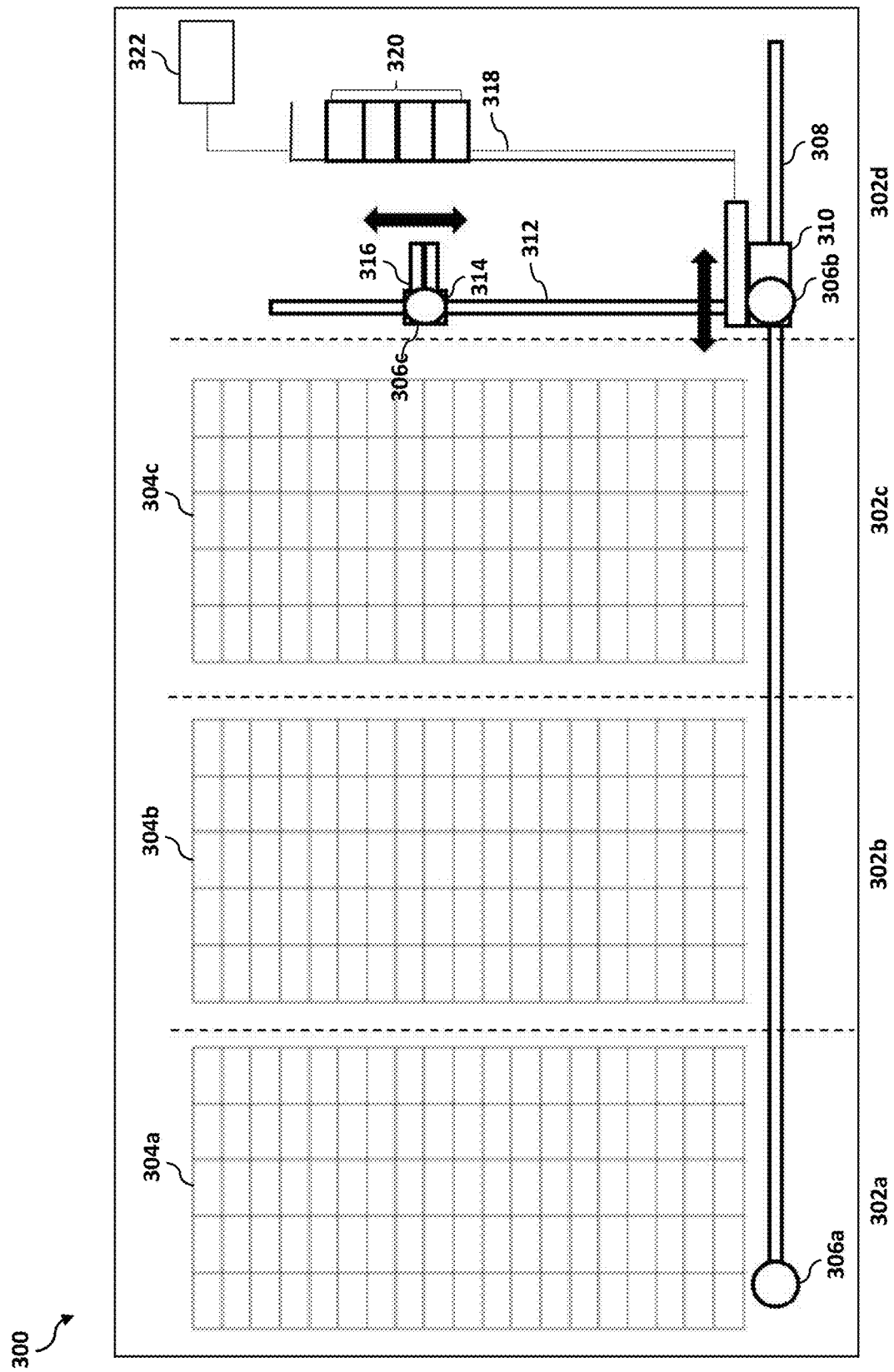
FIG. 3 is a schematic diagram of the tape library storage system with multiple frames according to at least one embodiment.

Referring now to FIG. 3, a schematic diagram of the tape library storage system 300 with multiple frames 302*a-d* according to at least one embodiment is depicted. The tape library storage system is comprised of four frames with tape cells 304*a-c* located within each frame. Three piezoelectric sensors (i.e., transducers) 306*a-c* are added into the tape library storage system, as described previously at 202. One sensor 306*a* is in frame 302*a*, while the sensors 306*b* and 306*c* are in frame 302*d*. Sensor 306*b* in frame 302*d* is located on the X-rail, depicted at 308, and within the X-slider and gear, depicted at 310. As described previously, and as can be seen from the block diagram, the X-gear travels horizontally within the tape library storage system 300. The second sensor 306*c* located within frame 302*d* is on the Y-rail 312, or the X-Y accessor. As described previously, the Y-rail 312 travels vertically within the tape library storage system 300. The Y-slider with gear is depicted at 314 and the cartridge picker is depicted at 316. The tape drive slots of the tape library storage system are depicted at 318, and the drives are depicted at 320. The tape library storage system controller is depicted at 322.

Figure 4:
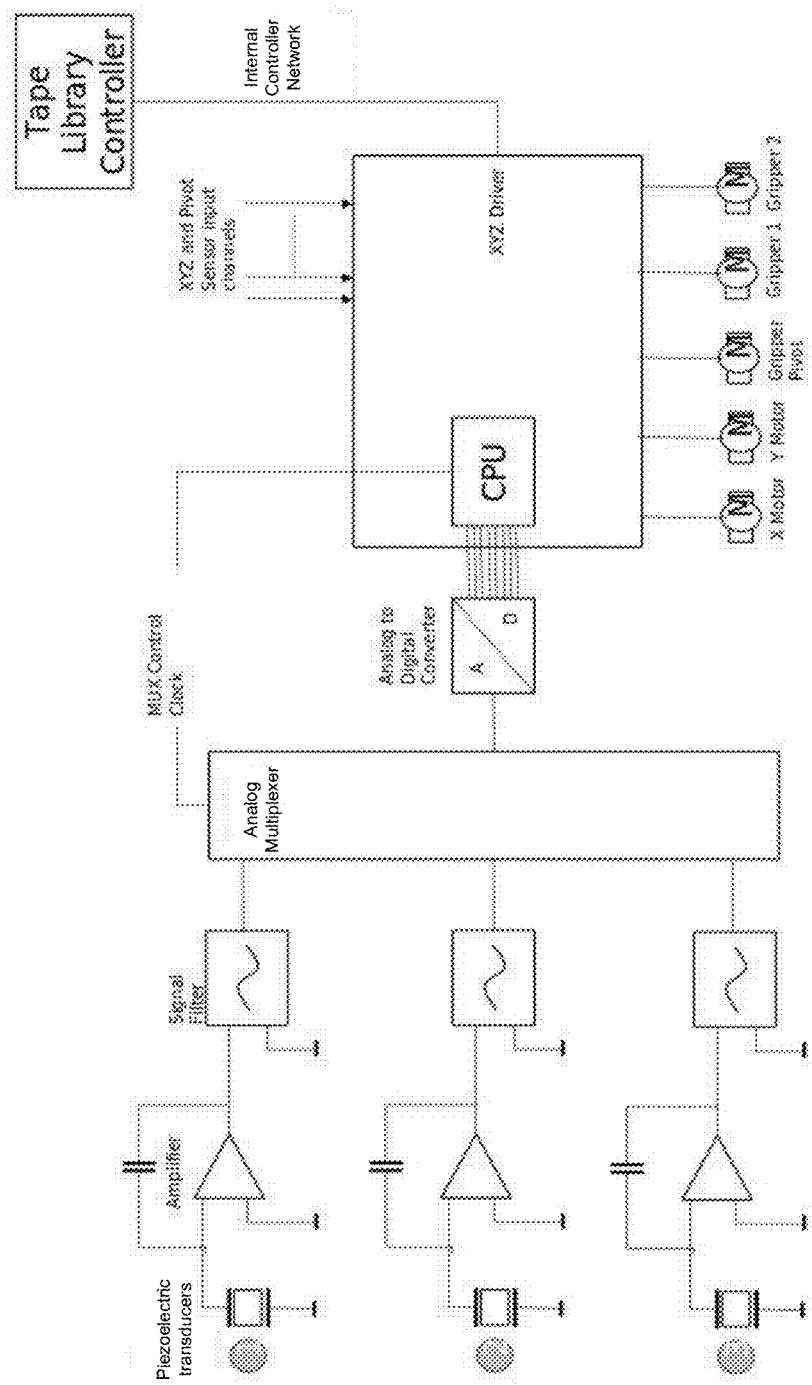
FIG. 4 is a circuit diagram of piezoelectric sensors according to at least one embodiment.

Referring now to FIG. 4, an electrical drawing 400 of piezoelectric sensors 306*a-c* according to at least one embodiment is depicted. Piezoelectric sensors added into the tape library storage system 300, as described previously at 202, may produce vibrations which may be detected by the tape library storage system 300. An amplifier and a signal filter may be used together to limit the amount of signal that passes through to the analog multiplexer. For example, the signal filter passes all signals below a certain threshold. The analog multiplexer then takes several signals as input and passes through a single signal to the analog to digital converter, which converts the analog signal picked up by the amplifier or microphone into a digital signal, passed through to the central processing unit (CPU). Once the signal is processed in the CPU, an output may be generated and provided to the program manager, as described previously at 206.

It may be appreciated that FIGS. 2 through 4 provide only an illustration of one embodiment and do not imply any limitations with regard to how different embodiments may be implemented. Many modifications to the depicted embodiment(s) may be made based on design and implementation requirements.

Figure 5:
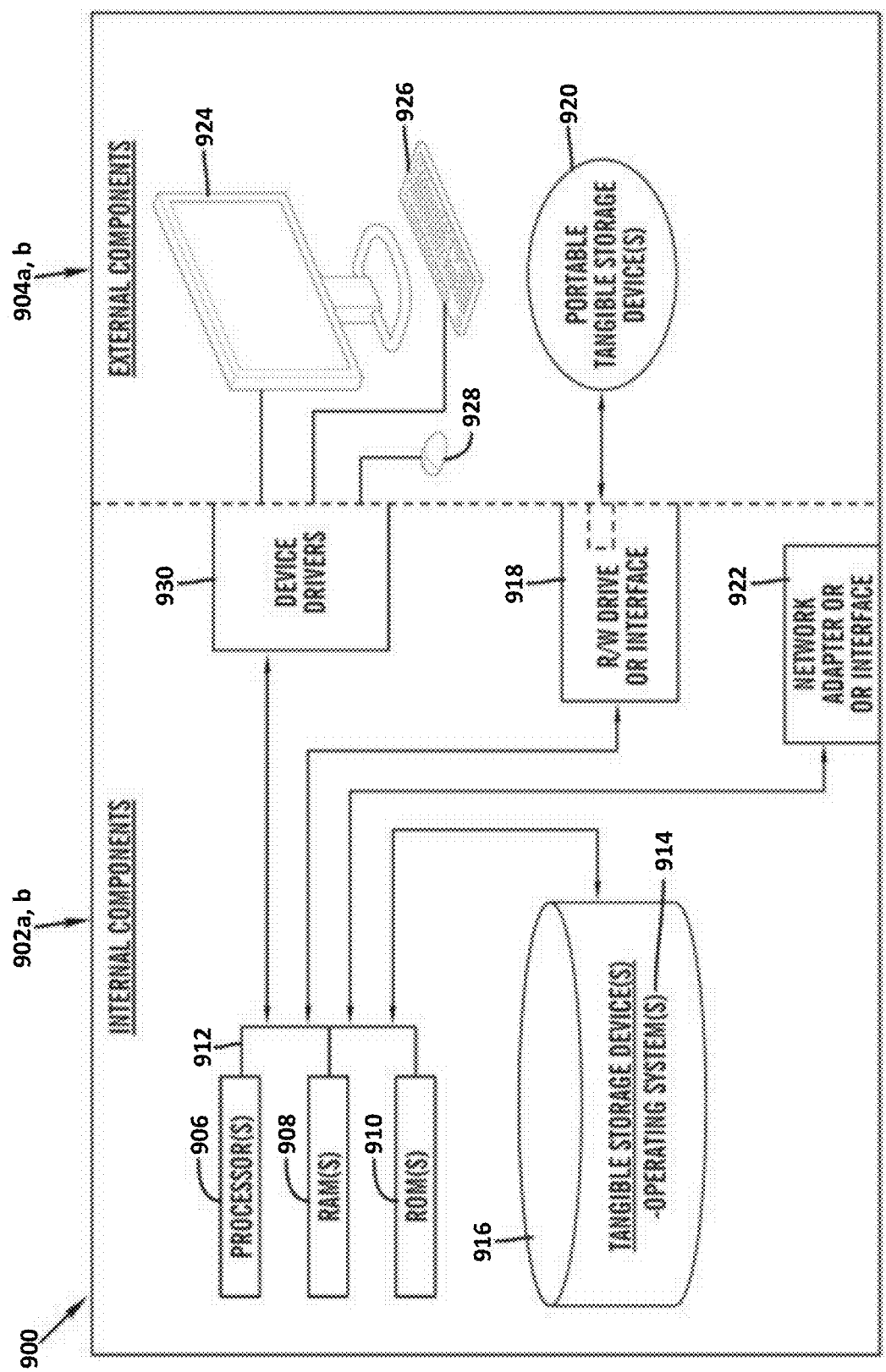
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 5. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the integrated failure indication program 110a in client computer 102, and the integrated failure indication program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the integrated failure indication program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the integrated failure indication program 110a in client computer 102 and the integrated failure indication program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the integrated failure indication program 110a in client computer 102 and the integrated failure indication program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
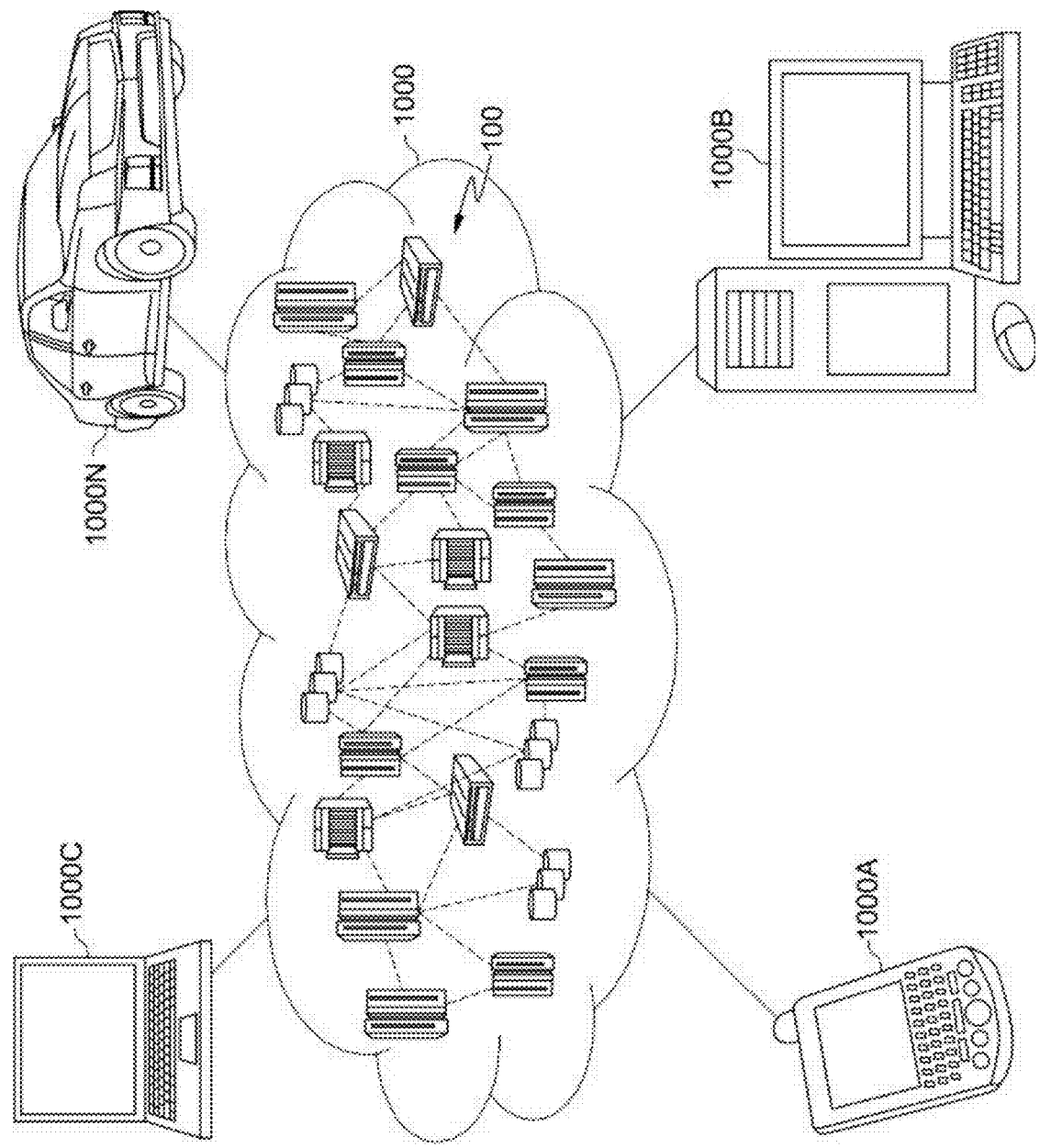
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
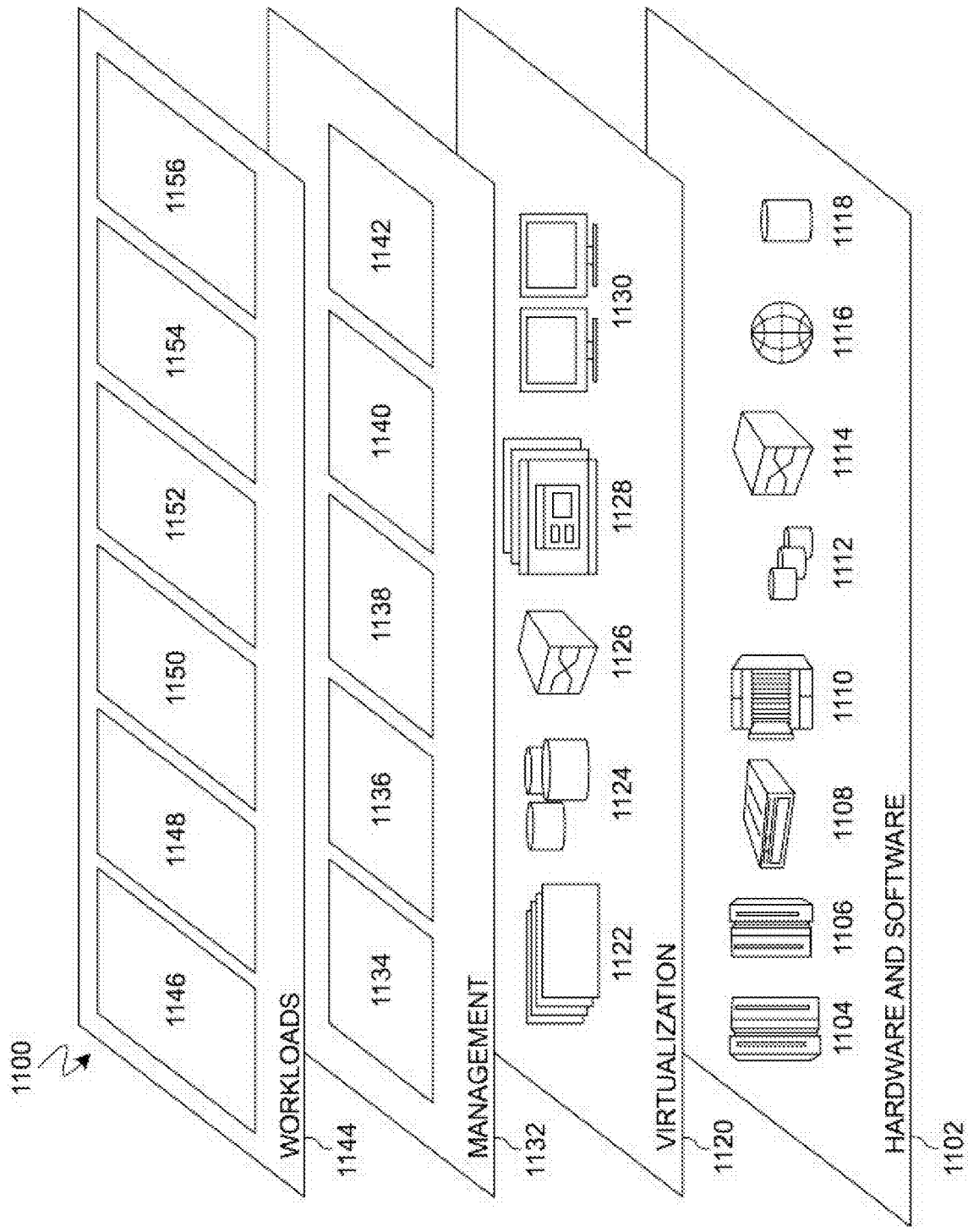
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and integrated failure indication 1156. An integrated failure indication program 110a, 110b provides a way to detect that a physical hardware failure may be imminent within a tape library storage system by utilizing cognitive sound and vibration analysis.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for integrated failure indication of a tape system, the method comprising:

receiving a plurality of sensor data from a plurality of sensors mounted within the tape system, wherein each of at least two of the plurality of sensors is mounted to sense data of a corresponding tape frame comprising a set of tape cells;

transferring the received plurality of sensor data via a standardized protocol, including message queuing telemetry transport (MQTT), to a cognitive cloud solution;

determining that the received plurality of sensor data is abnormal, wherein the sensor data includes frequency data, wherein the abnormal status is determined by comparing the frequency data to at least one stored frequency, wherein the sensor data is determined to be abnormal when that the frequency data is not the same as the at least one stored frequency, or the sensor data is determined to be abnormal if the frequency data matches the at least one stored frequency that corresponds to an abnormal status;

generating an alert based on determining that the received plurality of sensor data is abnormal; and sending the generated alert to a program manager.

2. The method of claim 1, wherein the received plurality of sensor data is generated by internet-connected sensors located within a tape library storage system.

3. The method of claim 1, wherein the received plurality of sensor data is generated by a piezoelectric sensor.

4. The method of claim 1, wherein determining that the received plurality of sensor data is abnormal further comprises a machine-to-machine connectivity protocol and a cognitive cloud solution.

5. The method of claim 1, wherein the received plurality of sensor data is generated by a sound detecting microphone.

6. The method of claim 1, wherein determining that the received plurality of sensor data is abnormal comprises comparing the received plurality of sensor data to a database of classified sound and vibration data.

7. The method of claim 1, wherein sending the generated alert to a program manager comprises sending an email notification.

8. A computer system for integrated failure indication of a tape system, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a plurality of sensor data from a plurality of sensors mounted within the tape system, wherein each of at least two of the plurality of sensors is mounted to sense data of a corresponding tape frame comprising a set of tape cells;

transferring the received plurality of sensor data via a standardized protocol, including message queuing telemetry transport (MQTT), to a cognitive cloud solution;

determining that the received plurality of sensor data is abnormal, wherein the sensor data includes frequency data, wherein the abnormal status is determined by comparing the frequency data to at least one stored frequency, wherein the sensor data is determined to be abnormal when that the frequency data is not the same as the at least one stored frequency, or the sensor data is determined to be abnormal if the frequency data matches the at least one stored frequency that corresponds to an abnormal status;

generating an alert based on determining that the received plurality of sensor data is abnormal; and sending the generated alert to a program manager.

9. The computer system of claim 8, wherein the received plurality of sensor data is generated by internet-connected sensors located within a tape library storage system.

10. The computer system of claim 8, wherein the received plurality of sensor data is generated by a piezoelectric sensor.

11. The computer system of claim 8, wherein determining that the received plurality of sensor data is abnormal further comprises a machine-to-machine connectivity protocol and a cognitive cloud solution.

12. The computer system of claim 8, wherein the received plurality of sensor data is generated by a sound detecting microphone.

13. The computer system of claim 8, wherein determining that the received plurality of sensor data is abnormal comprises comparing the received plurality of sensor data to a database of classified sound and vibration data.

14. The computer system of claim 8, wherein sending the generated alert to a program manager comprises sending an email notification.

15. A computer program product for integrated failure indication of a tape system, comprising:

one or more computer-readable storage media and program instructions stored on at least one of the one or more tangible storage media, the program instructions executable by a processor to cause the processor to perform a method comprising:

receiving a plurality of sensor data from a plurality of sensors mounted within the tape system, wherein each of at least two of the plurality of sensors is mounted to sense data of a corresponding tape frame comprising a set of tape cells;

transferring the received plurality of sensor data via a standardized protocol, including message queuing telemetry transport (MQTT), to a cognitive cloud solution;

determining that the received plurality of sensor data is abnormal, wherein the sensor data includes frequency data, wherein the abnormal status is determined by comparing the frequency data to at least one stored frequency, wherein the sensor data is determined to be abnormal when that the frequency data is not the same as the at least one stored frequency, or the sensor data is determined to be abnormal if the frequency data matches the at least one stored frequency that corresponds to an abnormal status;

generating an alert based on determining that the received plurality of sensor data is abnormal; and sending the generated alert to a program manager.

16. The computer program product of claim 15, wherein the received plurality of sensor data is generated by internet-connected sensors located within a tape library storage system.

17. The computer program product of claim 15, wherein the received plurality of sensor data is generated by a piezoelectric sensor.

18. The computer program product of claim 15, wherein determining that the received plurality of sensor data is abnormal further comprises a machine-to-machine connectivity protocol and a cognitive cloud solution.

19. The computer program product of claim 15, wherein the received plurality of sensor data is generated by a sound detecting microphone.

20. The computer program product of claim 15, wherein determining that the received plurality of sensor data is abnormal comprises comparing the received plurality of sensor data to a database of classified sound and vibration data.

* * * * *